United States Patent [19]
Micali

[11] Patent Number: 5,790,665
[45] Date of Patent: Aug. 4, 1998

[54] ANONYMOUS INFORMATION RETRIEVAL SYSTEM (ARS)

[76] Inventor: Silvio Micali, 459 Chestnut Hill Ave., Brookline, Mass. 02146

[21] Appl. No.: 785,524

[22] Filed: Jan. 17, 1997

Related U.S. Application Data

[60] Provisional application No. 60/010,119 Jan. 17, 1996.
[51] Int. Cl.$^6$ ............... H04L 9/00; H04L 9/08; H04L 9/32
[52] U.S. Cl. .............. 380/4; 380/9; 380/21; 380/23; 380/25; 380/49; 380/50
[58] Field of Search ............ 380/4, 9, 21, 23, 380/25, 49, 50, 59, 24, 28

[56] References Cited

U.S. PATENT DOCUMENTS

| | | | |
|---|---|---|---|
| 3,956,615 | 5/1976 | Anderson et al. | 380/24 |
| 4,186,871 | 2/1980 | Anderson et al. | 380/24 |
| 4,218,738 | 8/1980 | Matyas et al. | 380/25 |
| 4,317,957 | 3/1982 | Sendrow | 380/24 |
| 4,375,579 | 3/1983 | Davida et al. | 380/28 |
| 4,723,283 | 2/1988 | Nagasawa et al. | 380/21 X |
| 5,243,652 | 9/1993 | Teare et al. | 380/21 |
| 5,392,351 | 2/1995 | Hasebe et al. | 380/4 |
| 5,615,264 | 3/1997 | Kazmierczak et al. | 380/4 |
| 5,721,779 | 2/1998 | Funk | 380/23 |

*Primary Examiner*—Bernarr E. Gregory
*Attorney, Agent, or Firm*—Foley Hoag & Eliot

[57] ABSTRACT

An information retrieval system in which data is retrieved anonymously by a user with the assistance of one or more trusted agents.

1 Claim, No Drawings

ANONYMOUS INFORMATION RETRIEVAL SYSTEM (ARS)

CROSS-REFERENCE TO RELATED APPLICATION

The present application is based on provisional application No. 60/010,119 filed Jan. 17, 1996 and entitled "Anonymous Information Retrieval System (ARS)."

TECHNICAL FIELD

This invention relates to information retrieval methods and systems, and more particularly to a technique for anonymous retrieval of data from a database.

BACKGROUND OF THE INVENTION

It is known in the art to provide a method enabling a user to query two or more databases (containing the same items) so that he could retrieve the item he wanted without letting a single database know which item he actually retrieved.

In sum, their method requires that the user also asks about "fake items" (i.e., items he is not interested in), thus causing the amount of transmitted bits to increase considerably. Their method (1) makes use of a plurality of databases, each containing the same items; (2) identifies the user to each of the databases; but (3) hides from each database the item he really is interested in.

SUMMARY OF THE INVENTION

The present invention presents a different solution to a different problem, although still related to providing privacy to database access.

The method (1) makes use of a single database, (2) hides the identity of the requesting user from the database, but (3) does not hide the requested item from the database. The method generates only a single request and does not cause the amount of transmitted bits to increase by a multiplicative factor (rather there is a small overhead due to special routing information).

Briefly described, the method preferably comprises sending a query to the database by means of an anonymous message with an anonymous return receipt, (e.g., like in a method of Chaum) except that the return receipt is actually substituted with or includes the item requested.

DETAILED DESCRIPTION OF THE PREFERRED EMBODIMENTS

The method preferably uses two trusted entities, although more can be added. Preferably the user sends his item-request to the database as follows. The user encrypts with the database's key the following data: the item-request; the user's own address encrypted with the first entity's key (as a return address); and an ordinary key chosen by the user. This encrypted triple and the identity of the database (as the addressee information, in case the two entities are not specialized in communications among users and a fixed database) is then encrypted with the key of the second entity. The resulting encryption is then sent by the user to the first entity (preferably, after further encrypting it with the first entity's key).

The first entity takes away its own encryption layer (if any), and causes the resulting data to be received by the second entity.

The second entity then retrieves the addressee information and sends the database the encrypted "triple" comprising (a) the item-request, (b) the encrypted return address, and (c) the ordinary key. (This triple can be further encrypted with a key of the database if desired).

The database retrieves the item requested, the encrypted return address, and the key. Then, it fetches the requested item and encrypts it with the received key. It then sends the encrypted item and the received encrypted return address to the second entity (preferably, encrypting this transmission with the second entity's key).

The encrypted item then reaches the user in a similar (but backward) manner. The user then uses the chosen ordinary key for decrypting the item requested.

Thus, preferably no one except the user and the database knows what the item-request and the item itself are. However, the database preferably does not know who the requesting user is. The database always gets its requests through (e.g.) the second entity.

Measures can be taken to defeat traffic analysis, or making it less effective. (In particular, further encryption with a party's key, preferably probabilistic, may be quite effective to this end.) Public key encryption can be used instead of ordinary one, and vice versa. Some of the encryption layers or a more sparing use of encryption can be made; for instance if complex, indirect, traffic analysis is not as feared as a direct traffic analysis. Digital signatures can be used within the method, and so on. The user can pay the entities on a subscription basis, so that his identity is not linked to a given item-request. Alternatively, the user can pay the first entity, who knows how much data was shipped from and to the user, according to his usage of the system. The first entity can then pay the second one and/or the database if so wanted. The encrypted return address may not be delivered to the addressee but rather left with the second entity. When the second entity receives the item requested from the database, then, the encrypted item requested is forwarded or is caused to be received together with the encrypted return address by the first entity who will then send the encrypted item requested to the requesting user. In such a case, the encrypted return address is not encrypted together with the item-request and the ordinary key. Rather, it is sent to the second entity separately or encrypted together with the addressee information. Alternatively, no encrypted return address is used. Rather, when the first entity receives the initial communication from the requesting user this communication is associated with a label and is forwarded to the second entity together with the label. When the second entity receives from the database the encrypted requested item, it sends it to the first entity together with the label. Thus, the first entity can, from the label, determine to which user should the encrypted requested item be forwarded.

Of course, this method extends to work with more entities rather than two entities or with auxiliary entities between the first entity and the second entity and/or between the requesting user and the first entity and/or between the second entity and the database. Also, each entity could use its own labels for routing backwards the encrypted requested item to the requesting user. Alternatively, the requested item may not be encrypted and yet the identity of the requesting user may be hidden from the database. Also, the return routing can occur still via the first entity first and then the second entity. In this case, however, the encryption of the return address should be prepared differently.

While the invention has been disclosed in connection with the preferred embodiments shown and described in detail, various modifications and improvements thereon will become readily apparent to those skilled in the art.

Accordingly, the spirit and scope of the present invention is to be limited only by the following claims.

What is claimed is:

1. A method of retrieving information from a database with the assistance of at least one trusted entity, wherein the database does not know the identity of the requesting user, comprising the steps of:

having the requesting user send to a database a message identifying the item requested, providing the requesting user's address, and including an ordinary key, said message being encrypted with an encryption key of the database and said identification of the requesting user's address being encrypted with an encryption key of the trusted entity;

having the database remove its own encryption layer, retrieve the item requested, encrypt it with the ordinary key, and send the encrypted item requested to the trusted entity along with the encrypted requesting user's address; and having the trusted entity take away its own encryption layer and send the encrypted item requested to the requesting user.

* * * * *